United States Patent Office 3,578,684
Patented May 11, 1971

3,578,684
PERFLUORO-β-OXA-δ-VALEROLACTONE
James R. Throckmorton, St. Paul, Minn., assignor to Minnesota Mining and Manufacturing Company, St. Paul, Minn.
No Drawing. Filed Mar. 21, 1969, Ser. No. 809,397
Int. Cl. C07d 7/06
U.S. Cl. 260—340.2          5 Claims

ABSTRACT OF THE DISCLOSURE

Perfluoro-β-oxa-δ-valerolactone, and a process for its preparation comprising heating a perfluorooxydiacetyl halide in the presence of an alkali metal fluoride, the compound being useful as a chemical intermediate.

BACKGROUND OF THE INVENTION

The present invention relates to a novel, heterocyclic compound, perfluoro-β-oxa-δ-valerolactone and its preparation.

Certain perfluorolactones have been reported in the chemical literature. Two of these have been prepared by the thermal degradation of the silver salts of perfluoroglutaric and perfluoroadipic acids in excess iodine. The others have been obtained from reactions between appropriately substituted perfluoroorganic precursors. See, for example, Hauptschein et al., J. Am. Chem. Soc., 73, p. 2461 (1951); 74, p. 1974 (1952); England et al., J. Am. Chem. Soc., 88, p. 5582 (1966); and U.S. Pat. No. 3,280,150.

In one instance, a substituted perfluoro-β-oxa-δ-valerolactone, specifically perfluoro-2-oxo-3,6-dimethyl-1,4 dioxane has been obtained as described in British Pat. No. 1,051,649 and U.S. Pat. No. 3,404,162. However, none of the cited publications and patents suggest the compound of the instant invention nor do they teach the preparation of the compound of the present invention by the direct fluoride ion initiated, intramolecular cyclization of a perfluorodiacid fluoride starting material as described by applicant herein.

According to the present invention, the novel compound, perfluoro-β-oxa-δ-valerolactone has the formula

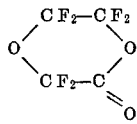

and is a clear, colorless liquid having a boiling point of 30° C. at atmospheric pressure.

The compound is useful as a chemical intermediate, forming perfluoro-1,3-dioxolane when exposed to ultraviolet radiation, the final product finding usefulness as a chemically inert solvent.

The compound of the present invention is generally prepared by contacting a liquid perfluorooxydiacetyl halide, for example, a chloride or fluoride, which compounds are known in the art (e.g., U.S. Pat. No. 3,250,806) and which are prepared by well-known methods, having the formula

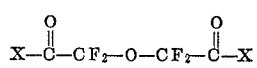

where X is a halogen atom, with an anhydrous alkali metal fluoride under substantially anhydrous conditions at a temperature of about 20° C. to 200° C. at atmospheric pressure. Examples of such alkali metal fluorides are lithium, sodium, potassium, cesium and rubidium fluorides. Generally the reaction mixture is heated to reflux temperature and allowed to proceed until the reflux temperature becomes constant (typically 35° C.). The conversion of the starting material to the desired product is accompanied by the formation of perfluorooxydiacetyl fluoride by displacement of the chloride ion when X is chlorine. Although inert solvents, such as glymes, sulfolane, acetonitrile and halocarbon solvents and the like, and pressures above and below atmospheric pressure may be used, these variations have not generally been preferred for most applications.

As previously mentioned, the utility of perfluoro-β-oxa-δ-valerolactone is demonstrated by its conversion to perfluoro-1,3-dioxolane on exposure to ultraviolet radiation. This photolysis reaction, which may be carried out in either a gaseous or liquid phase, provides a novel route to perfluoro-1,3-dioxolane, a fluorocarbon solvent which is temperature stable and chemically inert, and yet has good solvent properties characteristic of the cyclic fluorocarbon ethers.

The term ultraviolet radiation as used herein is used in its conventional sense to mean photon energy having average wavelengths less than about 4000 A. units, the lower limit being determined in a specific situation by the transmission characteristics of the material through which the photon energy must pass. The lower limit is usually in the range of about 1800 to 2000 A. units.

Wavelengths of about 2000 to 3000 A. units are preferred since they are readily produced and provide efficient energy to further expedite the desired reaction. Mercury arc lamps are convenient and commercially available sources of such radiation, as is well known in the art.

The invention will be further illustrated by the following non-limiting examples:

EXAMPLE I

In the preparation of perfluoro-β-oxa-δ-valerolactone from perfluorooxydiacetyl chloride, 186 gm. (3.2 moles) of anhydrous potassium fluoride was added incrementally to 304 gm. (1.25 moles) of perfluorooxydiacetyl chloride contained in a three-necked flask fitted with a mechanical stirrer, a thermometer and a condenser which was connected with polypropylene tubing to a —78° C. gas trap protected with a Drierite drying tube. The stirred reaction mixture was heated at reflux until the reflux temperature decreased to a constant value (typically 68 to 35° C.), indicating that the reaction was complete. Distillation of the mixture gave a total of 237 gm. of product.

Fractionation of an aliquot of the distillate by vapor phase chromatography revealed a mixture of two principal products identified as perfluoro-β-oxa - δ - valerolactone (44%) and perfluorooxydiacetyl fluoride (56%). Fractional distillation was also effective as a separation technique. The lactone was identified by elemental analyses, and by infrared, mass, and $F^{19}$ n.m.r. spectroscopy.

Analysis.—Calc'd for $C_4F_6O_3$ (percent): C, 22.87; F, 54.28. Found (percent): C, 22.70; F, 54.30.

EXAMPLE II

Preparation of perfluoro-β-oxa-δ-valerolactone from perfluorooxydiacetyl fluoride:

Perfluorooxydiacetyl fluoride, 1.9 gm. (.009 mole), was condensed onto 0.8 gm. of anhydrous cesium fluoride (0.005 mole) in a Fischer-Porter reactor fitted with a magnetic stirring bar. The mixture was stirred and heated at 50–55° C. until the ratio of the carbonyl absorption bands for perfluorooxydiacetyl fluoride (5.28μ) and perfluoro-β-oxa-δ-valerolactone (5.36μ) in the infrared spectrum of the volatile product mixture was constant, which required about 24 hr. Fractionation of the product mixture by vapor phase chromatography revealed a mixture of 56% perfluorooxydiacetyl fluoride and 36% perfluoro-β-oxa-δ-valerolactone.

EXAMPLE III

In preparing perfluoro-β-oxa-δ-valerolactone from perfluorooxydiacetyl bromide, the procedure of Example 1 is followed. However, 66.4 gm. (0.2 mole) of perfluorooxydiacetyl bromide is used. Similarly, when using the iodide, 85.2 gm. (0.2 mole) is used. The yield of the product is substantially the same as recited in Example I.

EXAMPLE IV

A mixture of 14.7 gm. (.07 mole) of perfluoro-β-oxa-δ-valerolactone and 0.6 gm. (0.003 mole) of perfluorooxydiacetyl fluoride and 233 gm. of a perfluorocyclic ether solvent were added to a three-necked, quartz photoreactor fitted with a quartz immersion well and a water condenser which was connected in series with polypropylene tubing to a —78° C. gas trap and —183° C. gas trap protected with a calcium sulfate drying tube. This stirred mixture was irradiated at 40° C. for 5 hr. with a 450-watt medium pressure mercury vapor ultraviolet lamp. A total of 8.9 gm. (70%) of perfluoro-1,3-dioxolane (B.P. about —22° C.) was obtained by distillation of the perfluorocyclic ether solvent solution (5.2 gm. of product condensed in a —78° C. gas trap connected to the water condensor), and by vacuum line distillation of the —78° C. trap from the photolysis reaction through a —78° C. trap and a —196° C. (3.7 gm.) trap.

What is claimed is:
1. The compound perfluoro-β-oxa-δ-valerolactone having the formula

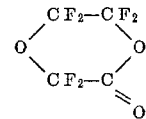

2. A process for the preparation of perfluoro-β-oxa-δ-valerolactone comprising heating a perfluorooxydiacetyl halide at temperatures of about 20 to 200° C. in the presence of an alkali metal fluoride under substantially anhydrous conditions.

3. A process as recited in claim 2 wherein heating is done under substantially anhydrous conditions at atmospheric pressure.

4. A process as recited in claim 2 wherein said perfluorooxydiacetyl halide is perfluorooxydiacetyl chloride.

5. A process as recited in claim 2 wherein said perfluorooxydiacetyl halide is perfluorooxydiacetyl fluoride.

References Cited

UNITED STATES PATENTS 2,911,414  11/1959  Simmons _____ 260—340.2X
3,404,162  10/1968  Selman _____ 260—340.2

NORMA S. MILESTONE, Primary Examiner

U.S. Cl. X.R.

260—340.9; 204—158R